United States Patent [19]
Yamamoto et al.

[11] Patent Number: 5,946,433
[45] Date of Patent: Aug. 31, 1999

[54] METHOD FOR PRODUCING A PHOTOCOUPLER AND A PHOTOCOUPLER PRODUCED BY THE SAME

[75] Inventors: Hiroyuki Yamamoto, Kashihara; Yoshio Yoshida, Nara, both of Japan

[73] Assignee: Sharp Kabushiki Kaisha, Osaka, Japan

[21] Appl. No.: 08/974,476

[22] Filed: Nov. 20, 1997

[30] Foreign Application Priority Data

Nov. 27, 1996 [JP] Japan .................................. 8-315774

[51] Int. Cl.⁶ ...................................................... G02B 6/34
[52] U.S. Cl. .......................... 385/36; 385/131; 385/147; 359/900
[58] Field of Search ............................... 385/14, 36, 147, 385/129–132; 359/900

[56] References Cited

U.S. PATENT DOCUMENTS

| | | | |
|---|---|---|---|
| 4,637,684 | 1/1987 | Tomita et al. | 350/96.19 |
| 4,932,743 | 6/1990 | Isobe et al. | 350/96.19 |
| 5,119,452 | 6/1992 | Yokomori et al. | 385/36 |
| 5,208,008 | 5/1993 | Isobe et al. | 385/36 |
| 5,235,589 | 8/1993 | Yokomori et al. | 385/36 |
| 5,418,765 | 5/1995 | Misawa et al. | 385/36 |

FOREIGN PATENT DOCUMENTS

| | | |
|---|---|---|
| 3-122605 | 5/1991 | Japan . |
| 3-192207 | 8/1991 | Japan . |
| 4-159503 | 6/1992 | Japan . |
| 4-289531 | 10/1992 | Japan . |
| 6-130249 | 5/1994 | Japan . |
| 8-106023 | 4/1996 | Japan . |
| 9-258062 | 10/1997 | Japan . |

*Primary Examiner*—Hung N. Ngo
*Attorney, Agent, or Firm*—Dike, Bronstein, Roberts & Cushman, LLP; David G. Conlin; George W. Neuner

[57] ABSTRACT

A method for producing a photocoupler includes the steps of: forming a waveguide structure on a substrate; forming a photoresist layer having a groove on the waveguide structure; mounting a prism on the photoresist layer so as to partially cover the groove; bonding the prism on the waveguide structure by injecting an adhesive into the groove; and removing the photoresist layer. The groove has a T-shaped pattern including a transverse section extending in a first direction and a longitudinal section extending in a second direction perpendicular to the first direction. The transverse section has a first width in the second direction which is smaller than a second length of a bonding face of the prism in the second direction. The prism is bonded to the waveguide structure through the bonding face. The longitudinal section has a second width in the first direction which is smaller than a first length of the bonding face of the prism in the first direction. The transverse section has a first length in the first direction which is greater than the first length of the bonding face of the prism in the first direction. The longitudinal section has a second length in the second direction which is greater than the second length of the bonding face of the prism in the second direction. The adhesive is injected into an end portion of the longitudinal section which is distanced away from the transverse section, the end portion not being covered by the prism.

16 Claims, 9 Drawing Sheets

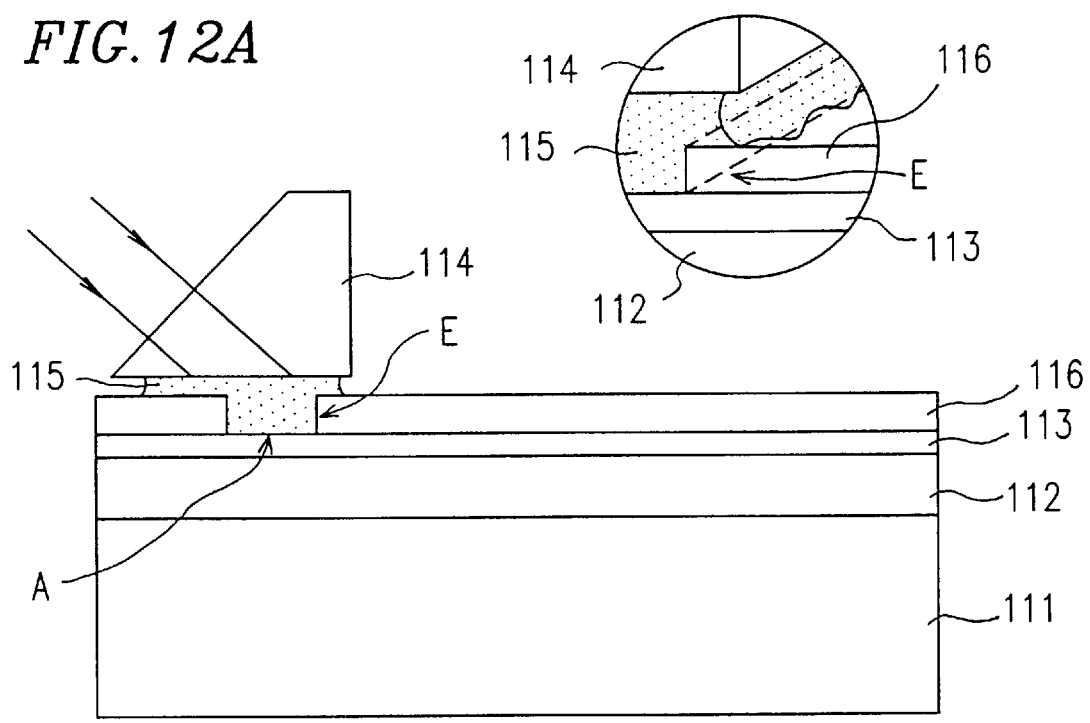

METHOD FOR PRODUCING A PHOTOCOUPLER AND A PHOTOCOUPLER PRODUCED BY THE SAME

BACKGROUND OF THE INVENTION

1. Field of the Invention

The present invention relates to a method for producing a photocoupler used for introducing light to a waveguide device and a photocoupler produced by the same.

2. Description of the Related Art

Light input to a prism coupler is performed utilizing the phenomenon that, in the case of a prism coupler including a prism bonded to a waveguide, for example, when light is incident on the boundary between an area where a prism is existent and an area where no prism is existent (such a border will be referred to as the "edge surface"), the light incident in a tunneling effect manner on the area where the prism is existent is propagated through the area where no prism is existent without outgoing from the waveguide.

By such a method, however, the prism coupler cannot be integrally produced with the waveguide device. In order to realize integral production of a prism coupler with a waveguide device, a method of bonding a prism on the waveguide has been proposed (see, for example, Japanese Laid-Open Publication No. 4-159503). FIG. 11A is a cross-sectional view of such a conventional photocoupler, and FIG. 11B is an enlarged view of an edge surface e shown in FIG. 11A. As shown in FIG. 11A, the conventional photocoupler includes a substrate 111, a waveguide layer 112 provided on the substrate 111, and an equivalent gap layer 113 provided on the waveguide layer 112. The equivalent gap layer 113 has a refractive index lower than that of the waveguide layer 112. A prism 114 formed of a dielectric material is bonded to the equivalent gap layer 113 by a photocurable adhesive 115. The prism 114 and the photocurable adhesive 115 each have a refractive index higher than that of the waveguide layer 112. The prism 114 is secured to the equivalent gap layer 113 by, for example, applying the photocurable adhesive 115 to a bonding face of the prism 114, next pressing the bonding face to the equivalent gap layer 113 and then radiating light through a slanting face of the prism 114 to cure the photocurable adhesive 115.

In such a structure, light incident on the prism 114 is transmitted through the bonding face of the prism 114 to the equivalent gap layer 113 in a tunneling effect manner and propagated through the waveguide layer 112. As shown in FIG. 11B, the edge surface e of the photocurable adhesive 115 does not cross the top surface of the waveguide along a straight line because of the surface tension of the photocurable adhesive 115. Accordingly, even if light is incident so that the incident position of the light spot (defined by the distance between the edge surface and the center of the light spot) in the direction of the longer diameter thereof is optimum, the coupling efficiency changes in accordance with the incident position of the light spot in the direction of the shorter diameter. Thus, it is difficult to precisely determine the incident position at which the coupling efficiency is maximum. Even if the incident position is determined at a position which is considered to be optimum, the maximum coupling efficiency cannot be necessarily obtained.

In order to solve the above-described problem, a structure shown in FIG. 12A has been proposed. FIG. 12B is an enlarged view of an edge surface E shown in FIG. 12A. In this structure, a light blocking layer 116 having an opening A is provided on the gap layer 113. The light blocking layer 116 has a refractive index lower than that of the waveguide layer 112. A sufficient amount of the photocurable adhesive 115 is applied to the inner wall of the opening A of the light blocking layer 116, and the prism 114 is pressed onto the photocurable adhesive 115. Then, light is radiated through the prism 114 to cure the adhesive 115. In such a structure, the photocurable adhesive 115 has the straight edge surface E along the inner wall of the opening A of the light blocking layer 116. Thus, the coupling efficiency is stabilized.

The "straight edge line" refers to a line, among the lines made by the side surface of the photocurable adhesive 115 crossing the gap layer 113 at substantially a right angle, which is perpendicular to the light axis and is located opposite to the light incidence surface (slanting surface) of the prism 114. The degree of straightness of the edge line along which the edge surface crosses the top surface of the waveguide is relatively determined with respect to the longer diameter of an incident light spot. For example, where the incident light spot has a longer diameter of about 10 $\mu$m, the coupling efficiency is reduced to 90% of the maximum level when the incident position is offset by about ±2.5 $\mu$m. Based on this fact, the term "straight line" in this specification refers to a line which is offset from the center line by about ±0.5 $\mu$m or less.

In the above-described structure, it is difficult to adjust the amount of the photocurable adhesive 115 to fill the opening A. In the case where the amount of the photocurable adhesive 115 is excessively large, the photocurable adhesive 115 overflows around the side face of the prism 114 to flow to the section (not shown) supporting the prism 114. In the case where the amount of the photocurable adhesive 115 is excessively small, air bubbles remain in the opening A. Moreover, after the adhesive 115 is cured, the prism 114 is influenced by the stress accompanying shrinkage of the photocurable adhesive 115 while being supported by the light blocking layer 116. This presents a reliability problem. In an excessive case, the fatal phenomenon that the prism 114 is delaminated while the adhesive 115 is being cured may occur.

SUMMARY OF THE INVENTION

According to one aspect of the invention, a method for producing a photocoupler includes the steps of: forming a waveguide structure on a substrate; forming a photoresist layer having a groove on the waveguide structure; mounting a prism on the photoresist layer so as to partially cover the groove; bonding the prism on the waveguide structure by injecting an adhesive into the groove; and removing the photoresist layer. The groove has a T-shaped pattern including a transverse section extending in a first direction and a longitudinal section extending in a second direction perpendicular to the first direction. The transverse section has a first width in the second direction which is smaller than a second length of a bonding face of the prism in the second direction. The prism is bonded to the waveguide structure through the bonding face. The longitudinal section has a second width in the first direction which is smaller than a first length of the bonding face of the prism in the first direction. The transverse section has a first length in the first direction which is greater than the first length of the bonding face of the prism in the first direction. The longitudinal section has a second length in the second direction which is greater than the second length of the bonding face of the prism in the second direction. The adhesive is injected into an end portion of the longitudinal section which is distanced from the transverse section, the end portion not being covered by the prism.

In one embodiment of the invention, the prism has a trapezoidal cross section, and the step of injecting the adhesive includes the step of pressing a top face of the prism to secure the prism.

In one embodiment of the invention, the step of pressing a top face of the prism to secure the prism is performed using a metal probe having a diameter sufficiently small with respect to the size of the prism.

In one embodiment of the invention, the top face of the prism is optically polished.

In one embodiment of the invention, the top face of the prism is optically polished.

In one embodiment of the invention, the bonding face of the prism is treated by plasma before the prism is bonded to the waveguide structure.

In one embodiment of the invention, the bonding face of the prism and a bonding face of the waveguide structure corresponding to the bonding face of the prism are both treated by plasma before the prism is bonded to the waveguide structure.

In one embodiment of the invention, the adhesive is photocurable.

In one embodiment of the invention, the waveguide structure includes a waveguide layer and a gap layer formed on the waveguide layer.

According to another aspect of the invention, a photocoupler includes a waveguide structure provided on a substrate; and a prism bonded on the waveguide structure by an adhesive layer. The adhesive layer has a T-shaped pattern including a transverse section extending in a first direction and a longitudinal section extending in a second direction perpendicular to the first direction. The transverse section has a first width in the second direction which is smaller than a second length of a bonding face of the prism in the second direction. The prism is bonded to the waveguide structure through the bonding face. The longitudinal section has a second width in the first direction which is smaller than a first length of the bonding face of the prism in the first direction. The transverse section has a first length in the first direction which is greater than the first length of the bonding face of the prism in the first direction. The longitudinal section has a second length in the second direction which is greater than the second length of the bonding face of the prism in the second direction.

In one embodiment of the invention, the adhesive layer is formed of a photocurable adhesive.

In one embodiment of the invention, the prism has a trapezoidal cross section.

In one embodiment of the invention, a top face of the prism is optically polished.

In one embodiment of the invention, the bonding face of the prism is treated by plasma.

In one embodiment of the invention, the bonding face of the prism and a bonding face of the waveguide structure corresponding to the bonding face of the prism are both treated by plasma.

In one embodiment of the invention, the waveguide structure includes a waveguide layer and a gap layer provided on the waveguide layer.

In one embodiment according to the present invention, a prism having an optically polished top face and having a trapezoidal cross section is supported on a photoresist layer having a T-shaped groove. A photocurable adhesive is injected into the T-shaped groove through an adhesive injection opening located on the side of the prism which is opposite to the photocoupling section. For positional adjustment, the prism is supported by vacuum suction of the side face. While the adhesive is injected, the prism is secured to the photoresist layer by pressing the top face thereof by a small-diameter metal probe. The amount of the adhesive is adjusted by observing the bonding face of the prism by a microscope through the optically polished top face of the prism. When a sufficient amount of the adhesive is injected, light is radiated to cure the adhesive. The bonding face of the prism and, as necessary, the bonding face of the gap layer are treated by plasma before the bonding. In such a structure, the amount of the adhesive is relatively easily adjusted because the injection of the adhesive can be observed by a microscope. Such an easy adjustment prevents overflow of the adhesive around the side face of the prism prevents flow of the adhesive to the section supporting the prism, and prevents allowing the air bubbles to remain due to the lack of sufficient adhesive. After the adhesive is cured, the prism is supported only by the adhesive. However, since the bonding faces of the prism and the gap layer are treated by plasma as described above, the prism is not easily delaminated. Since the prism is secured by pressing the optically polished top face thereof using a metal probe, the prism is prevented from being dislocated by the impact generated when the adhesive is injected or by the surface tension of the adhesive, and also the injection of the adhesive can be easily observed by a microscope.

Thus, the invention described herein makes possible the advantages of providing (1) a useful method for producing a photocoupler for realizing easy adjustment of the amount of the adhesive, preventing overflow of the adhesive around the side face of the prism or flow of the adhesive to the section supporting the prism, preventing air bubbles from remaining due to the lack of sufficient adhesive, and supporting the prism only by the adhesive layer without positionally displacing the prism, and (2) a photocoupler produced by such a method.

These and other advantages of the present invention will become apparent to those skilled in the art upon reading and understanding the following detailed description with reference to the accompanying figures.

BRIEF DESCRIPTION OF THE DRAWINGS

FIG. 12A is a cross-sectional view of another conventional photocoupler; and

FIG. 12B is a partial enlarged view of FIG. 12A.

DESCRIPTION OF THE PREFERRED EMBODIMENTS

Hereinafter, the present invention will be described by way of illustrative examples with reference to the accompanying drawings.

EXAMPLE 1

A method for producing a photocoupler in one example according to the present invention will be described with reference to FIGS. 1 through 7.

Figure 1:
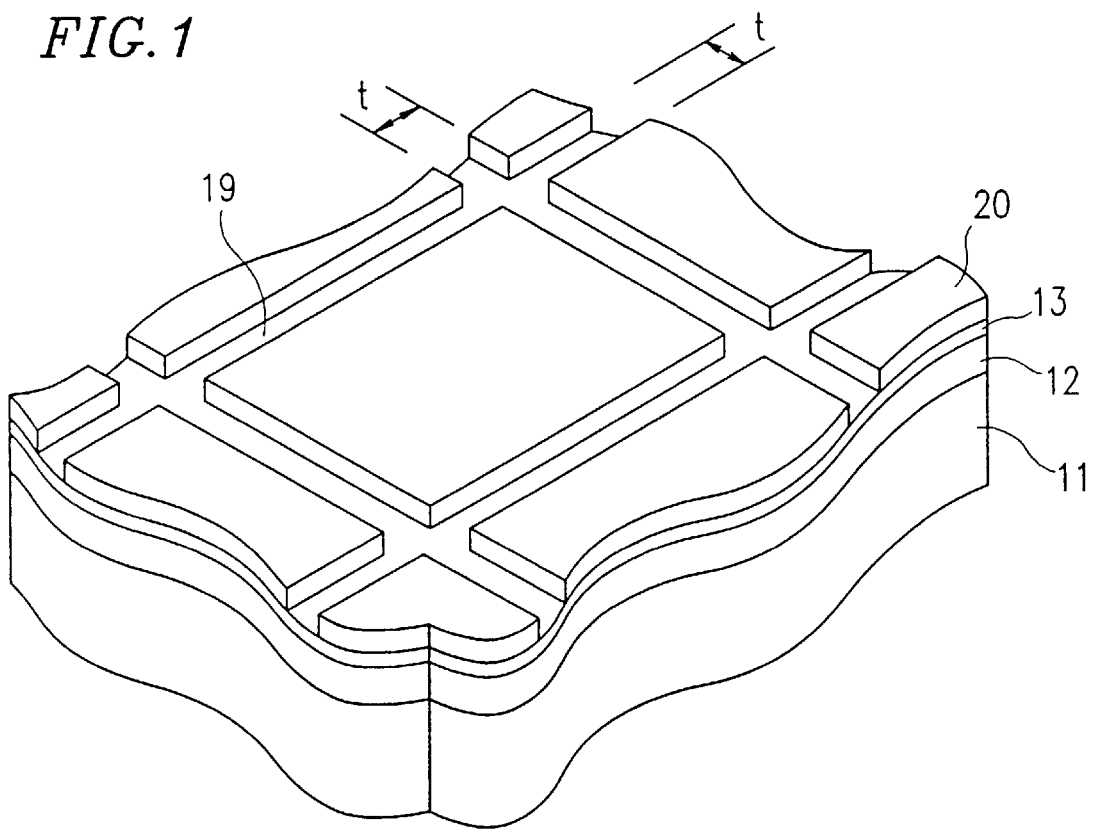
FIGS. 1 through 6 are isometric views showing steps of production of a photocoupler in one example according to the present invention.

First, as shown in FIG. 1, a waveguide layer 12, a gap layer 13 and a photoresist layer 20 are formed on a substrate 11 sequentially in this order. The photoresist layer 20 is formed to have a lattice-patterned groove 19. In this specification, the waveguide layer 12 and the gap layer 13 form a waveguide structure.

Specifically, the photoresist 20 is formed as follows. A photoresist material is applied to the gap layer 13 and baked. Next, a contact printing is performed by providing a photomask on the photoresist material. Then, development is performed using a special developer. The groove 19 of the resultant photoresist material 20 has a width t which is larger than a thickness of a blade, which will be used to dice the assembly of the layers into a plurality of chips later. Since the width t is larger than the thickness of the blade, the photoresist 20 is prevented from being caught up by the blade and thus shortening the life of the blade or decreasing the cutting speed.

Figure 2:
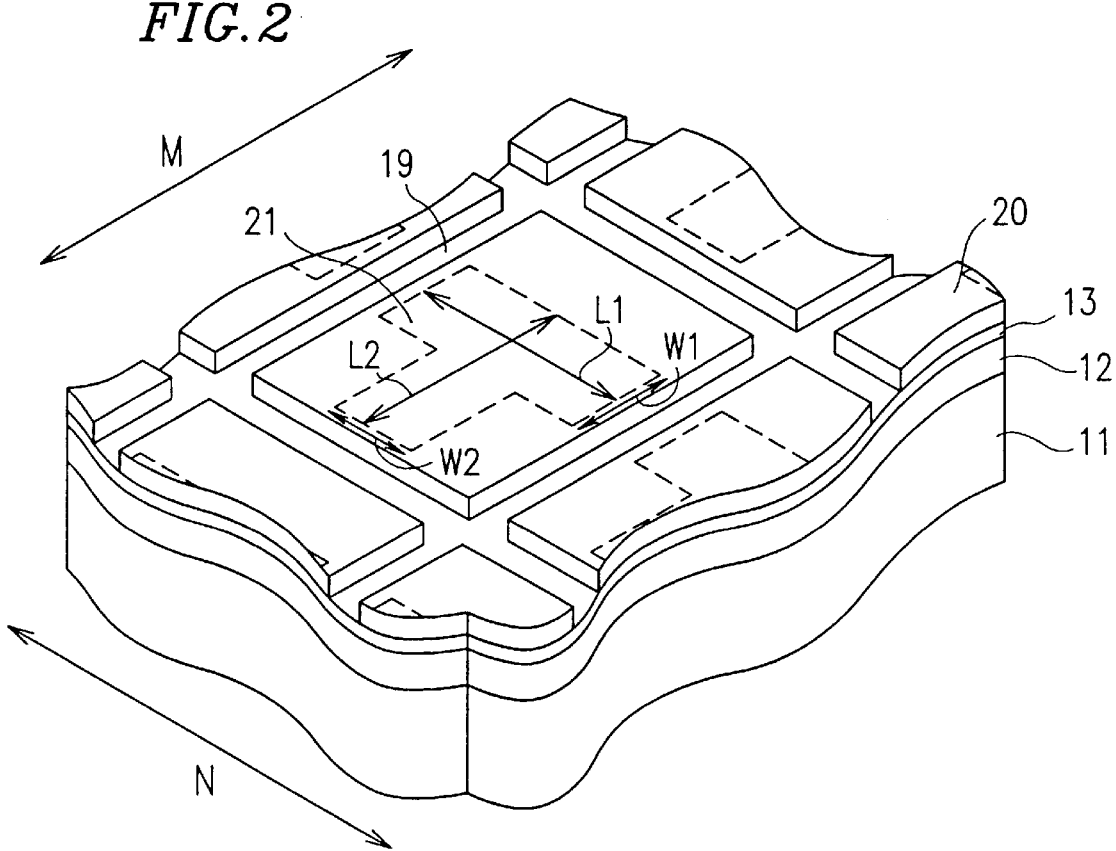

Next, as shown in FIG. 2, the photoresist layer 20 having the lattice-patterned groove 19 is exposed to light so as to form a T-shaped pattern 21. Specifically, a contact printing is performed by providing a photomask on the photoresist layer 20. Needless to say, the photoresist material used for the photoresist layer 20 is positive. The T-shaped pattern 21 has a transverse section extended in a first direction N and a longitudinal section extended in a second direction M perpendicular to the first direction N. A first length L1 of the transverse section in the first direction N is greater than a first length of a bonding face of a prism in the first direction N. The prism is represented by reference numeral 14 in FIG. 5 and will be bonded to the waveguide structure later through the bonding face. A second length L2 of the longitudinal section in the second direction M is sufficiently greater than the length of the bonding face of the prism (FIG. 5) in the second direction M. A width W1 of the transverse section in the second direction M is smaller than the second length of the bonding face of the prism (FIG. 5) in the second direction M, and a second width W2 of the longitudinal section in the first direction N is smaller than the first length of the bonding face of the prism (FIG. 5) in the first direction N. For example, in the case where the size of the bonding face of the prism is about 0.5 mm×0.5 mm, the first length L1 of the transverse section (in the first direction N) is about 0.7 mm, the second length L2 of the longitudinal section (in the second direction M) is about 1 mm, and the first and second widths W1 and W2 of the transverse and longitudinal sections are each about 0.3 mm. The latticepattern groove 19 has a width of about 300 $\mu$m in the case where the blade has a thickness of about 200 $\mu$m.

By forming the T-shaped pattern 21, the prism can be supported stably as described later, and an adhesive injection opening (represented by reference numeral 23A in FIG. 5) can be provided as described later. It is important that the length L2 in the second direction is sufficiently longer than the length of the bonding face of the prism 14 (FIG. 5) in the second direction in forming the adhesive injection opening 23A (FIG. 5) in a later step.

Figure 3:
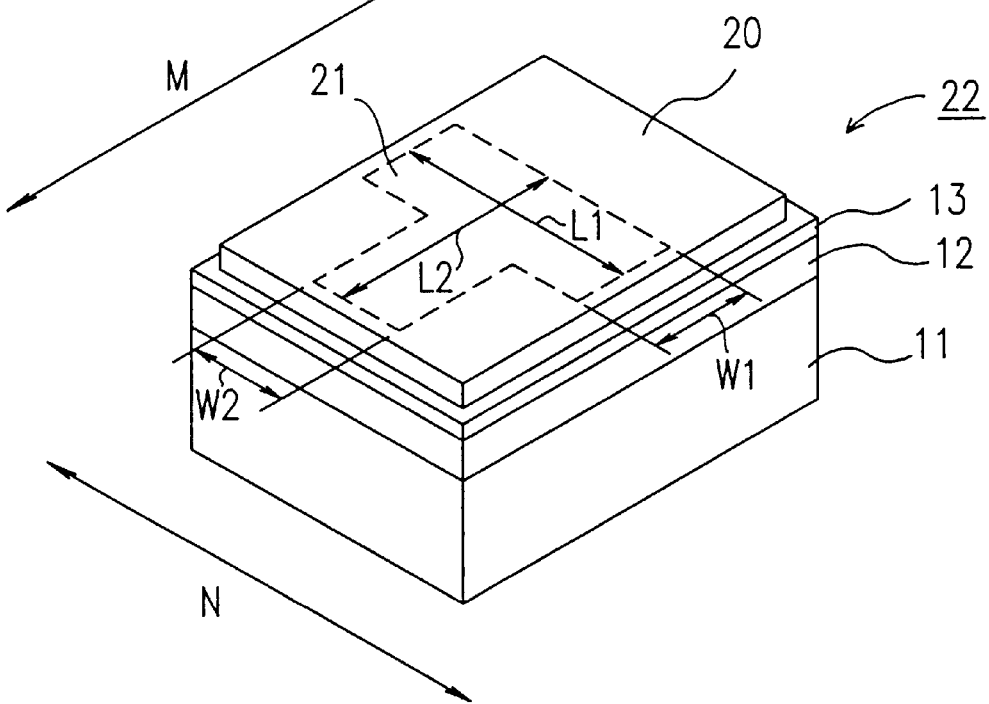

Then, as shown in FIG. 3, after the exposure is performed, the resultant assembly of layers is diced along the groove 19 (FIGS. 1 and 2) into a plurality of chips 22 (only one is shown in FIG. 3) under conditions which do not generate reaction of the photoresist material. Specifically, such a dicing operation is performed under a lamp emitting yellow light.

Figure 4:
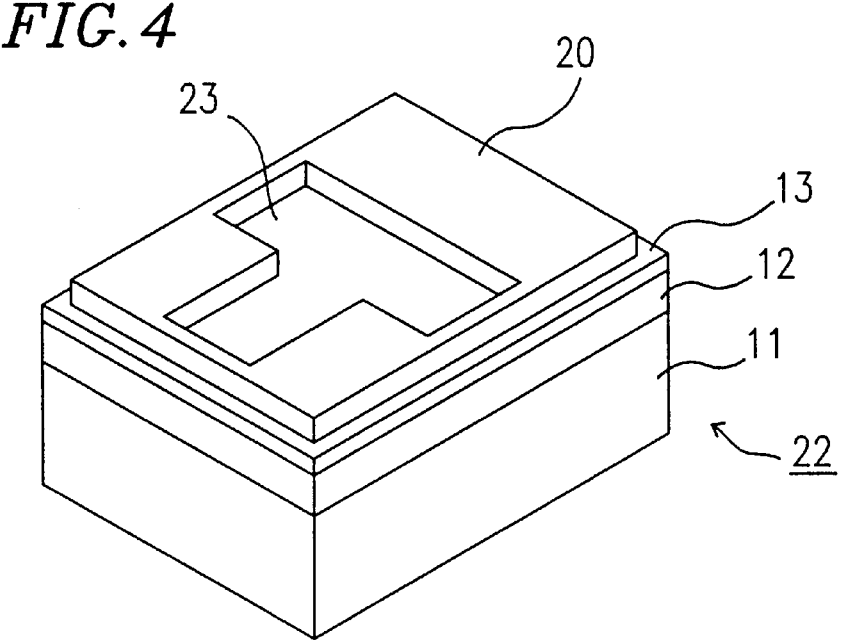

As shown in FIG. 4, the T-shaped patten 21 (FIG. 3) exposed to light is developed using a special developer, thereby forming a T-shaped groove 23. The development is performed after dicing in order to avoid contamination by the dicing process of a bonding face of the waveguide structure.

Now, with reference to FIGS. 5 through 7, a method for bonding a prism 14 to the chip 22 will be described.

Figure 5:
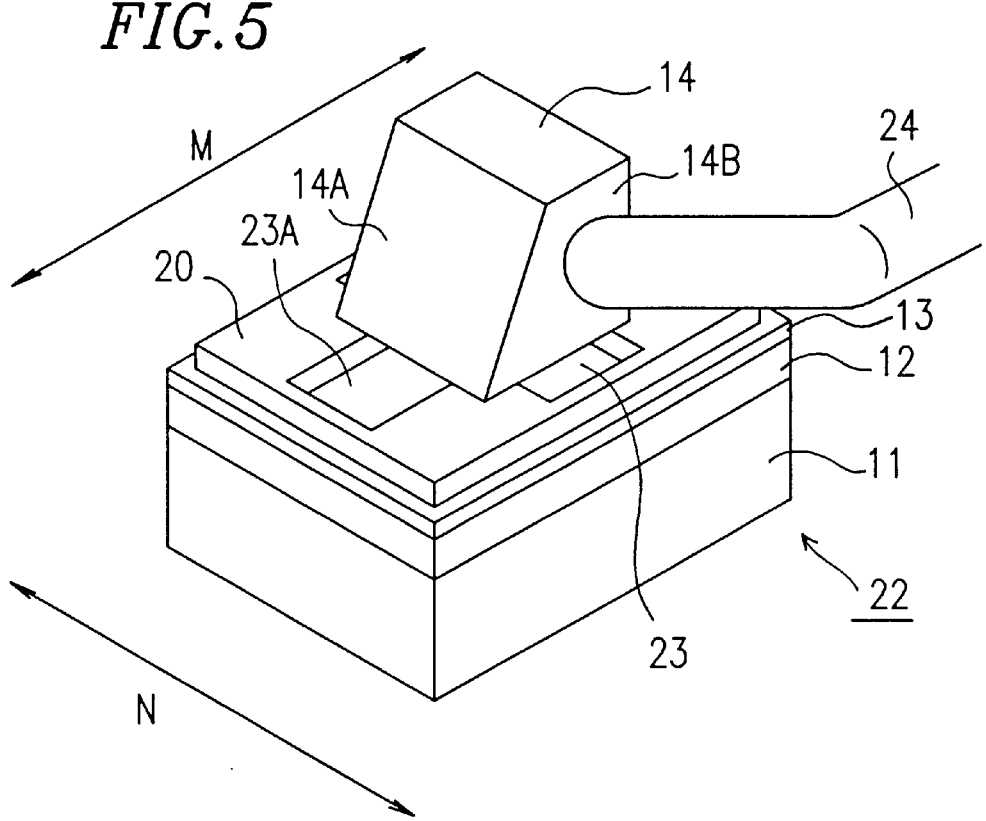

First, as shown in FIG. 5, the prism 14 is mounted on the chip 22 having the photoresist layer 20 with the T-shaped groove 23. In the subsequent steps, a part of the T-shaped groove 23 acts as an adhesive injection opening 23A, which is on the side of a slanting surface 14A of the prism 14, i.e., a part of the longitudinal section of the T-shaped groove 23 which is not covered by the prism 14 acts as the adhesive injection opening 23A. The above-described part of the longitudinal section of the T-shaped groove 23 includes an end of the T-shaped groove 23 distanced from the transverse section; i.e., the end has a sufficient distance from the slanting surface 14A of the prism 14 to allow for the injection of the adhesive 15. Accordingly, a photocoupling section on the other side of the prism 14 (corresponding to section C in FIG. 8) is not influenced by a photocurable adhesive 15 to be injected to the groove 23. The prism 14 is sufficiently small to be supported by a side face 14B by a suction applied by a first small-diameter tube 24 (preferably formed of metal). In this manner, the positional relationship between the chip 22 and the prism 14 can be adjusted.

The bonding face of the prism 14 is treated by plasma before being bonded to the chip 22. The bonding surface of the chip 22 can also be treated by plasma. The plasma treatment removes contamination components on the surfaces (for example, wax used for producing the prism 14) and also forms surface roughness on an atomic order of magnitude on the surface of the prism 14 for improving the bonding strength between the prism 14 and the chip 22.

Figure 6:
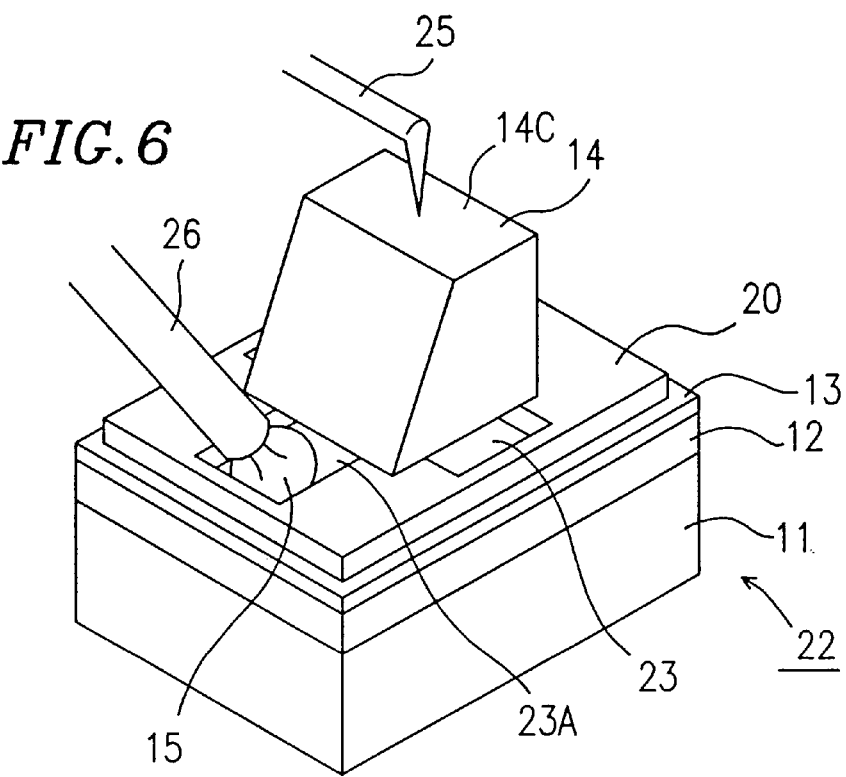

Next, as shown in FIG. 6, the small-diameter tube 24 (FIG. 5) is separated from the prism 14, and the prism 14 is now pressed by a metal probe 25 (second small-diameter tube) to be secured. A top surface 14C of the prism 14 is preferably flat, and the prism 14 is preferably a trapezoidal prism having a trapezoidal cross section. The diameter of the metal probe 25 needs to be sufficiently small with respect to the prism 14 in order to minimize the shadow created by the metal probe 25 in the light radiated to cure the adhesive. For example, in the case where the bonding face of the prism 14 is about 0.5 mm×0.5 mm, a tungsten probe having a diameter of about 0.2 mm is used as the metal probe 25. The tip of the probe 25 is processed to have a diameter of about 30 $\mu$m. When the photocurable adhesive 15 is injected through a third small-diameter tube 26 into the adhesive injection opening 23A, the photocurable adhesive 15 flows into the T-shaped groove 23. After a sufficient amount of the photocurable adhesive 15 is injected, the second small-diameter tube 26 is quickly separated from the chip 22.

In order to prevent the second small-diameter tube 26 from contacting the prism 14 or in order to prevent the prism 14 from being displaced by the surface tension of the photocurable adhesive 15, the prism 14 still needs to be secured by the metal probe 25. Since the top face 14C of the prism 14 is optically polished, the flow of the photocurable adhesive 15 into the T-shaped groove 23 can be observed by a microscope. After it is confirmed by observation using the microscope that a sufficient amount of the photocurable adhesive 15 has flowed into the T-shaped groove 23, light is radiated toward the photocurable adhesive 15. In the case where the photocurable adhesive 15 is UV-curable, UV light is used. The light is radiated uniformly in all directions. The top face 14C of the prism 14 which is optically polished efficiently guides the light to the photocurable adhesive 15.

Figure 7:
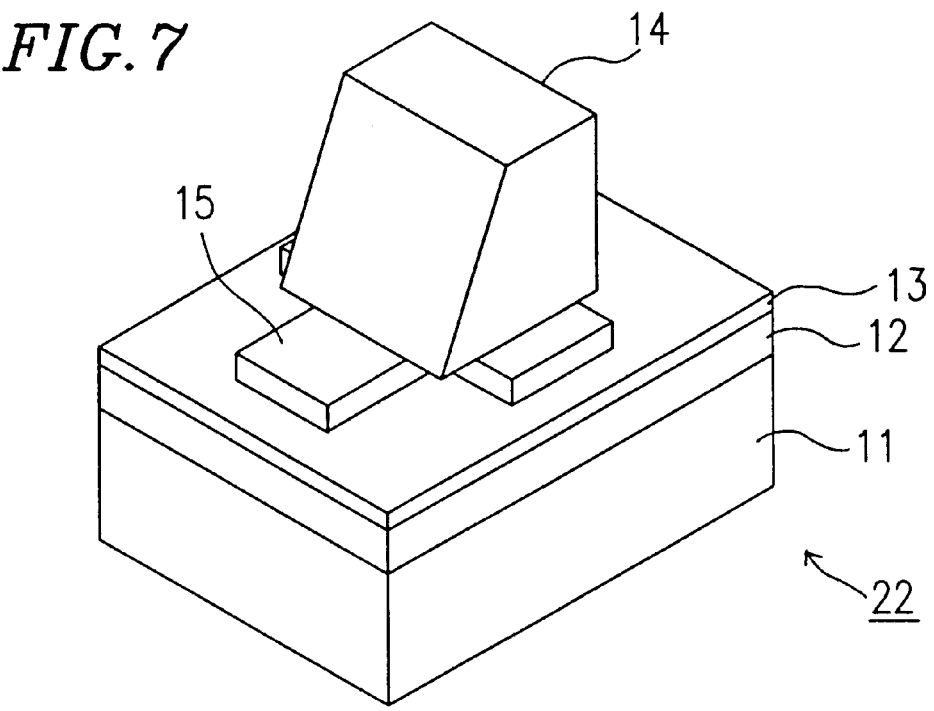
FIG. 7 is an isometric view of a photocoupler according to the present invention.

As shown in FIG. 7, after the photocurable adhesive 15 is cured, the photoresist layer 20 is removed using a resist remover. Needless to say, the resist remover is of a type having no influence on the photocurable adhesive 15 after being cured. Usable resist removers include N-methyl-2-pyrrolidone. For example, MICROPOSIT® 1165 REMOVER (produced by SHIPLEY FAR EAST LTD) is usable.

In this manner, a photocoupler according to the present invention is produced. As can be appreciated from FIG. 7, the prism 14 is bonded to the gap layer 13 only by the photocurable adhesive 15. In other words, the prism 14 is supported only by the photocurable adhesive 15 after the photocurable adhesive 15 is cured. Since the bonding face of the prism 14 is treated by plasma, the prism 14 is prevented from being delaminated from the gap layer 13.

Figure 8:
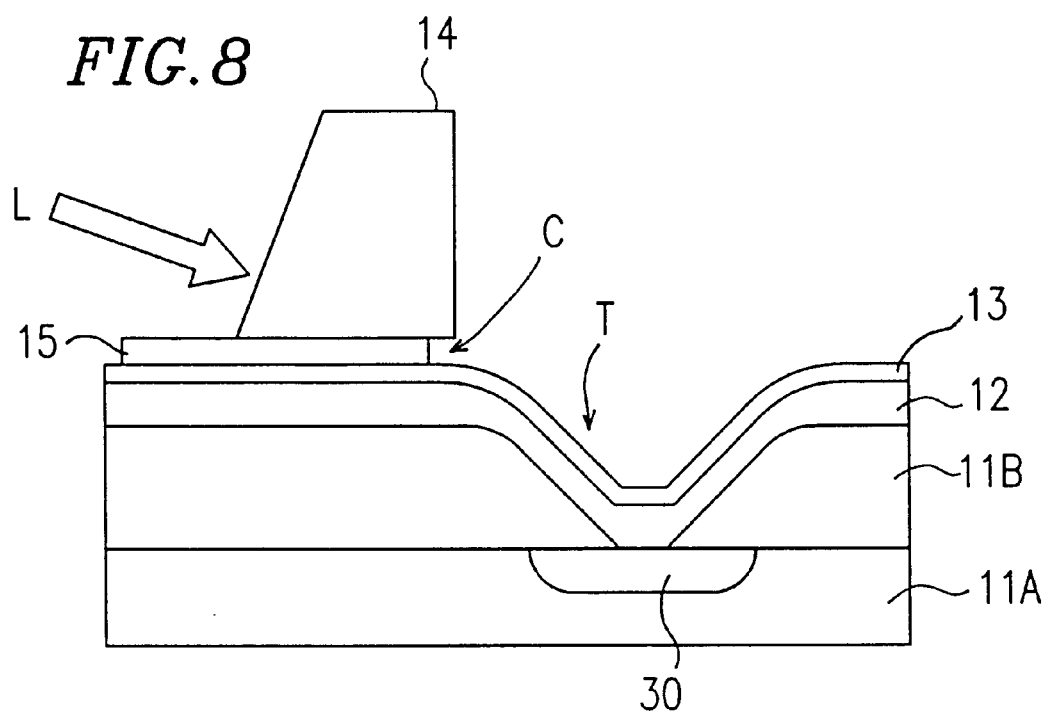
FIG. 8 is a cross-sectional view of a device including a photocoupler produced according to the present invention.

FIG. 8 is a cross-sectional view of a tapered waveguide-type photo-detector including a photocoupler according to the present invention. The photo-detector includes a silicon substrate IIA including a photo-detection section 30, a dielectric layer 11B having a thickness gradually reduced toward the photo-detection section 30, a waveguide layer 12, and a gap layer 13. The dielectric layer 11B, a waveguide layer 12, and the gap layer 13 are provided on the dielectric layer 11B sequentially in this order. Incident light L passes through a prism 14 and an adhesive layer 15, and is coupled to the waveguide layer 12 at the photocoupling section C. Then, the light L is propagated through a tapered section T with a low optical loss until being introduced to the photo-detection section 30. At the photo-detection section 30, the light L is converted into an electric signal.

EXAMPLE 2

In the above-described example, the formation of the T-shaped groove 23 and bonding of the prism 14 are performed after dicing. The dicing operation can be performed after the prism 14 is bonded to the waveguide structure as described below with reference to FIGS. 9 and 10. Identical elements previously discussed with respect to FIGS. 1 through 7 will bear identical reference numerals therewith and the descriptions thereof will be omitted.

Figure 9:
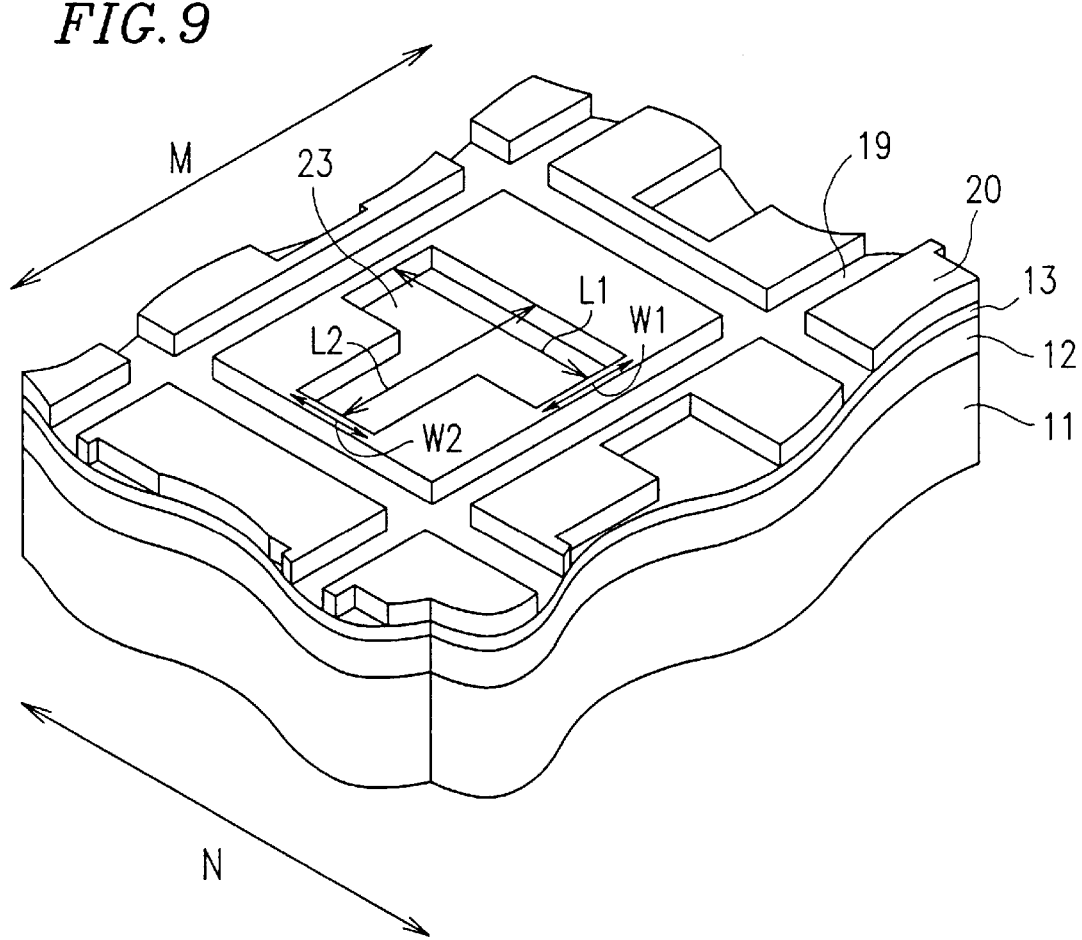
FIGS. 9 and 10 are isometric view showing steps of production of a photocoupler in another example according to the present invention.

As shown in FIG. 9, the photoresist layer 20 is formed to have the lattice-patterned groove 19 and the T-shaped groove 23. Specifically, a photoresist material is applied to the gap layer 13 and baked. Next, a contact printing is performed by providing a photomask on the photoresist material. Then, development is performed using a special developer. In this case, the photoresist material can be positive or negative. The T-shaped groove pattern 23 has substantially the same dimensions as those of the T-shaped pattern 21 described in the first example. The T-shaped groove 23 has a transverse section extended in a first direction N and a longitudinal section extended in a second direction M perpendicular to the first direction N. A length L1 of the first direction N is greater than the length of the bonding face of the prism 14 (FIG. 10) in the first direction N. A length L2 of the longitudinal section is sufficiently greater than the length of the bonding face of the prism (FIG. 10) in the second direction M. A width W1 of the transverse section is smaller than the length of the prism 14 (FIG. 10) in the second direction M, and a width W2 of the longitudinal section is smaller than the length of the prism 14 (FIG. 10) in the first direction N.

For example, in the case where the bonding face of the prism 14 is about 0.5 mm×0.5 mm, the length L1 of the transverse section (in the first direction N) is about 0.7 mm, the length L2 of the longitudinal section (in the second direction M) is about 1 mm, and the widths W1 and W2 of the transverse and longitudinal sections are each about 0.3 mm. The lattice-pattern groove 19 has a width of about 300 $\mu$m in the case where the blade has a thickness of about 200 $\mu$m.

Figure 10:
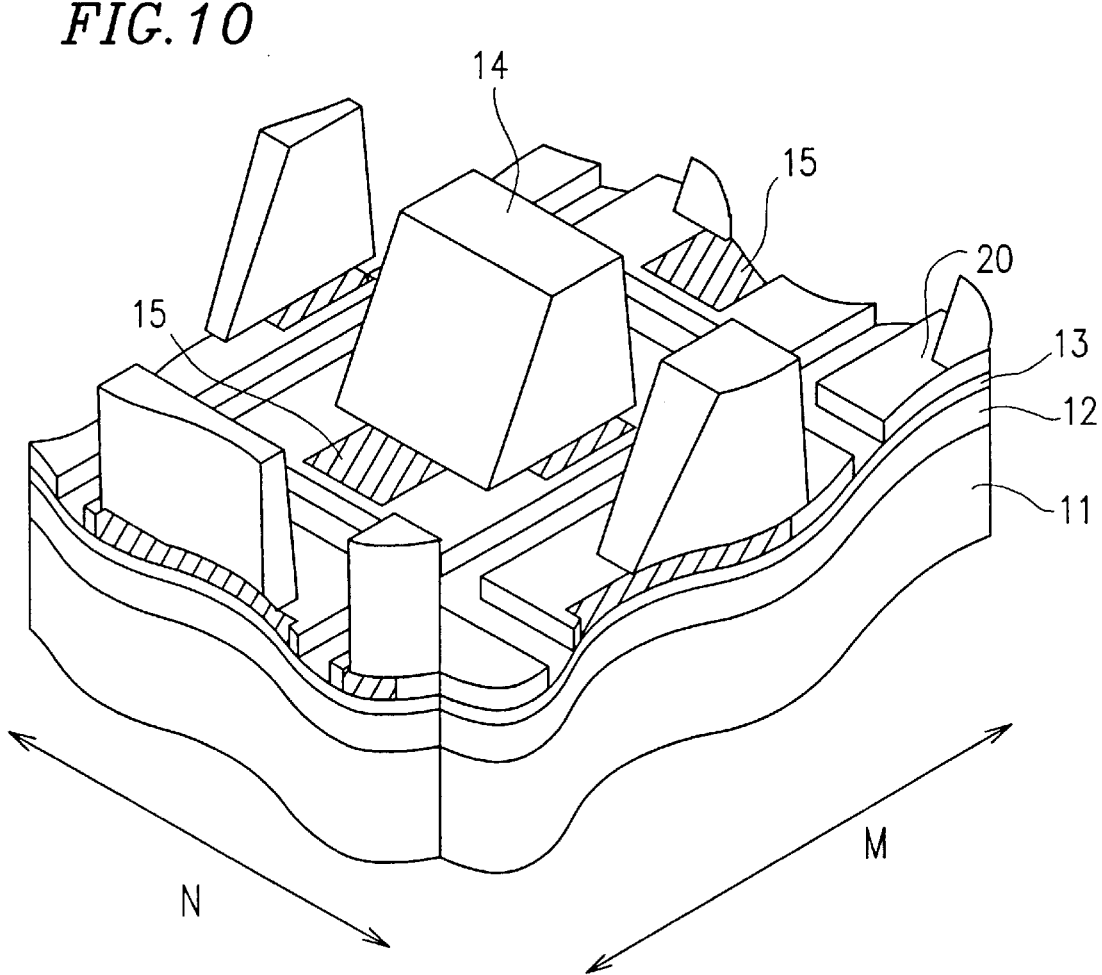
Figure 11B:
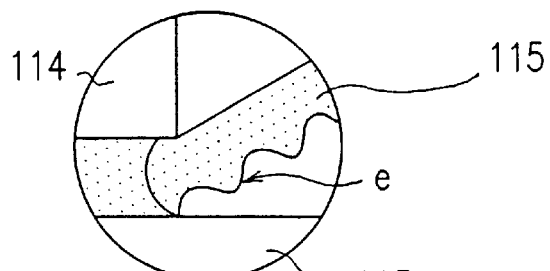
FIG. 11B is a partial enlarged view of FIG. 11A.
Figure 11A:
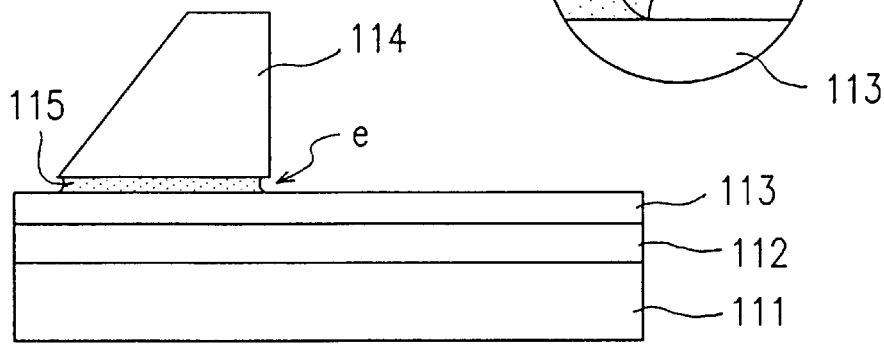
FIG. 11A is a cross-sectional view of a conventional photocoupler.

As shown in FIG. 10, the prisms 14 are bonded to the assembly of layers by the photocurable adhesive 15. The prisms 14 are supported, secured and bonded in the same manner as described above with reference to FIGS. 5 and 6. The photocurable adhesive 15 is cured in the same manner as described above. After the photocurable adhesive 15 is cured, the assembly of layers is diced into a plurality of chips. Then, the photoresist layer 20 is removed. In this manner, the same type of photocoupler produced in the first example is obtained.

In this example also, the prism 14 is supported only by the photocurable adhesive 15 after the photocurable adhesive 15 is cured. Since the bonding face of the prism 14 is treated by plasma, the prism 14 is prevented from being delaminated from the gap layer 13.

According to the present invention, the prism 14 is supported by the photoresist layer 20 having the groove 23 of a T-shape, in which the length L1 of the transverse section extended in the first direction N is longer than the length of the bonding face of the prism 14 in the first direction N, the length L2 of the longitudinal section extended in the second direction M is sufficiently longer than the length of the bonding face in the second direction M, the width W1 of the transverse section is smaller than the length of the prism in the second direction M, and the width W2 of the longitudinal section is smaller than the length of the prism in the first direction N. Due to such a shape of the T-shaped groove 23, the adhesive injection opening 23A can be provided, and moreover, the prism 14 can be stably supported when the adhesive 15 injected into the T-shaped groove 23 is cured. Accordingly, the productivity of the photocoupler is improved.

Since the adhesive injection opening 23A is formed on the side of the slanting face of the prism 14, i.e., opposite to the side where the photocoupling section is formed, the photocurable adhesive 15 is prevented from flowing to the photocoupling section. Thus, the characteristics of the photocoupler are stabilized.

Since the prism 14, which has a trapezoidal cross section, can be secured with respect to the waveguide structure using the flat top face 14C, the prism 14 is prevented from being displaced after the position of the prism 14 is adjusted until the bonding of the prism 14 is completed. This also improves the productivity of the photocoupler.

Since the prism 14 is pressed by the small-diameter metal probe 25 to be secured, the influence of the shadow of the probe 25 of light which is radiated to cure the adhesive 15 is minimized. This also improves the productivity of the photocoupler and stabilizes the characteristics thereof.

Since the top face 14C of the prism 14 is optically polished, the substrate can be easily observed and also the photocurable adhesive 15 can be sufficiently irradiated. Thus, the characteristics of the photocoupler are improved. Since the photocurable adhesive 15 can be injected while observing the injection by a microscope through the optically polished top face 14C of the prism 14, the amount of the photocurable adhesive 15 can be easily adjusted and confirmed. Accordingly, the photocurable adhesive 15 is prevented from overflowing around the side face of the prism 14 or flowing to the section supporting the prism 14, and air bubbles are prevented from remaining due to the lack of the adhesive. Thus, the productivity of the photocoupler is enhanced.

Although the prism 14 is supported only by the adhesive 15, the bonding strength of the prism 14 is improved since the bonding face is treated by plasma. Thus, the prism 14 is prevented from being delaminated. Accordingly, the characteristics and the production yield of the photocoupler are improved. In the case where the bonding faces of both the prism 14 and the gap layer 13 are treated by plasma, the bonding strength is still improved to prevent delamination of the prism 14. Accordingly, the characteristics and the production yield of the photocoupler are further improved.

In the case where the photoresist layer 20 is removed before the assembly of layers is diced into a plurality of chips 22, damaging of the blade and reduction in the cutting speed are avoided, thus improving the productivity of the photocoupler.

According to the present invention, a useful method is provided for producing a photocoupler for realizing easy adjustment of the amount of the adhesive, preventing overflow of the adhesive around the side face of the prism or flow of the adhesive to the section supporting the prism, preventing air bubbles from remaining due to the lack of the adhesive, and supporting the prism only by the adhesive layer without positionally displacing the prism. According to the present invention, a photocoupler produced by such a method can also be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a photocoupler, comprising the steps of:

forming a waveguide structure on a substrate;
   forming a photoresist layer having a groove on the waveguide structure;
   mounting a prism on the photoresist layer so as to partially cover the groove;
   bonding the prism on the waveguide structure by injecting an adhesive into the groove; and
   removing the photoresist layer, wherein:
     the groove has a T-shaped pattern including a transverse section extending in a first direction and a longitudinal section extending in a second direction perpendicular to the first direction,
     the transverse section has a first width in the second direction which is smaller than a second length of a bonding face of the prism in the second direction, the prism being bonded to the waveguide structure through the bonding face, and the longitudinal section has a second width in the first direction which is smaller than a first length of the bonding face of the prism in the first direction,
     the transverse section has a first length in the first direction which is greater than the first length of the bonding face of the prism in the first direction, and the longitudinal section has a second length in the second direction which is greater than the second length of the bonding face of the prism in the second direction, and
     the adhesive is injected into an end portion of the longitudinal section which is distanced away from the transverse section, the end portion not being covered by the prism.

2. A method for producing a photocoupler according to claim 1, wherein the prism has a trapezoidal cross section, and the step of injecting the adhesive includes the step of pressing a top face of the prism to secure the prism.

3. A method for producing a photocoupler according to claim 2, wherein the step of pressing a top face of the prism to secure the prism is performed using a metal probe having a diameter sufficiently small with respect to the size of the prism.

4. A method for producing a photocoupler according to claim 2, wherein the top face of the prism is optically polished.

5. A method for producing a photocoupler according to claim 3, wherein the top face of the prism is optically polished.

6. A method for producing a photocoupler according to claim 1, wherein the bonding face of the prism is treated by plasma before the prism is bonded to the waveguide structure.

7. A method for producing a photocoupler according to claim 1, wherein the bonding face of the prism and a bonding face of the waveguide structure corresponding to the bonding face of the prism are both treated by plasma before the prism is bonded to the waveguide structure.

8. A method for producing a photocoupler according to claim 1, wherein the adhesive is photocurable.

9. A method for producing a photocoupler according to claim 1, wherein the waveguide structure includes a waveguide layer and a gap layer formed on the waveguide layer.

10. A photocoupler, comprising:

a waveguide structure provided on a substrate; and
    a prism bonded on the waveguide structure by an adhesive layer,
    wherein the adhesive layer has a T-shaped pattern including a transverse section extending in a first direction and a longitudinal section extending in a second direction perpendicular to the first direction,
    the transverse section has a first width in the second direction which is smaller than a second length of a bonding face of the prism in the second direction, the prism being bonded to the waveguide structure through the bonding face, and the longitudinal section has a second width in the first direction which is smaller than a first length of the bonding face of the prism in the first direction, and the transverse section has a first length in the first direction which is greater than the first length of the bonding face of the prism in the first direction, and the longitudinal section has a second length in the second direction which is greater than the second length of the bonding face of the prism in the second direction.

11. A photocoupler according to claim 10, wherein the adhesive layer is formed of a photocurable adhesive.

12. A photocoupler according to claim 10, wherein the prism has a trapezoidal cross section.

13. A photocoupler according to claim 12, wherein a top face of the prism is optically polished.

14. A photocoupler according to claim 10, wherein the bonding face of the prism is treated by plasma.

15. A photocoupler according to claim 10, wherein the bonding face of the prism and a bonding face of the waveguide structure corresponding to the bonding face of the prism are both treated by plasma.

16. A photocoupler according to claim 10, wherein the waveguide structure includes a waveguide layer and a gap layer provided on the waveguide layer.

* * * * *